United States Patent
Donaldson

(10) Patent No.: US 9,147,049 B2
(45) Date of Patent: Sep. 29, 2015

(54) EMBEDDED BUILDING CONROLLER WITH STORED SOFTWARE LICENSE INFORMATION

(75) Inventor: Stuart G. Donaldson, Bothell, WA (US)

(73) Assignee: Honeywell International Inc., Morristown, NJ (US)

( * ) Notice: Subject to any disclaimer, the term of this patent is extended or adjusted under 35 U.S.C. 154(b) by 2471 days.

(21) Appl. No.: 11/839,889

(22) Filed: Aug. 16, 2007

(65) Prior Publication Data

US 2009/0048691 A1 Feb. 19, 2009

(51) Int. Cl.
G06Q 20/00 (2012.01)
G06F 21/10 (2013.01)

(52) U.S. Cl.
CPC ....................................... G06F 21/10 (2013.01)

(58) Field of Classification Search
USPC ....................................................... 705/51, 59
See application file for complete search history.

(56) References Cited

U.S. PATENT DOCUMENTS

| | | | |
|---|---|---|---|
| 5,023,907 A | 6/1991 | Johnson et al. | |
| 5,138,712 A | 8/1992 | Corbin | |
| 5,204,897 A | 4/1993 | Wyman | |
| 5,438,508 A | 8/1995 | Wyman | |
| 5,579,222 A | 11/1996 | Bains et al. | |
| 5,671,412 A | 9/1997 | Christiano | |
| 5,745,879 A | 4/1998 | Wyman | |
| 5,758,069 A | 5/1998 | Olsen | |
| 5,892,900 A * | 4/1999 | Ginter et al. | 726/26 |
| 6,343,280 B2 | 1/2002 | Clark | |
| 6,766,305 B1 | 7/2004 | Fucarile et al. | |
| 6,842,896 B1 | 1/2005 | Redding et al. | |
| 6,946,972 B2 * | 9/2005 | Mueller et al. | 340/870.02 |
| 6,968,384 B1 | 11/2005 | Redding et al. | |
| 7,035,918 B1 | 4/2006 | Redding et al. | |
| 7,103,574 B1 | 9/2006 | Peinado et al. | |
| 7,137,114 B2 | 11/2006 | Rich et al. | |
| 7,142,648 B1 | 11/2006 | Miller | |
| 7,171,662 B1 | 1/2007 | Misra et al. | |
| 7,216,108 B2 * | 5/2007 | Hastings et al. | 705/63 |
| 7,250,874 B2 * | 7/2007 | Mueller et al. | 340/870.06 |
| 7,453,373 B2 * | 11/2008 | Cumeralto et al. | 340/870.02 |
| 7,505,453 B2 * | 3/2009 | Carpenter et al. | 370/352 |
| 7,684,569 B2 * | 3/2010 | Moriyama et al. | 380/277 |
| 7,702,435 B2 * | 4/2010 | Pereira et al. | 701/29 |
| 2001/0039537 A1 * | 11/2001 | Carpenter et al. | 705/400 |
| 2002/0015497 A1 | 2/2002 | Maruyama et al. | |
| 2002/0091645 A1 | 7/2002 | Tohyama | |
| 2002/0107809 A1 | 8/2002 | Biddle et al. | |
| 2002/0120578 A1 | 8/2002 | Sy | |

(Continued)

OTHER PUBLICATIONS

Flexlm End Users Guide, Version 9.5, 168 pages, Aug. 2004.

(Continued)

Primary Examiner — John Hayes
Assistant Examiner — John M Winter
(74) Attorney, Agent, or Firm — Seager Tufte & Wickhem LLP

(57) ABSTRACT

A building controller unit having a building controller adapted to control one or more building components of a building, and a license file stored within the building controller unit for storing software license information. In some cases, the building controller unit may include a license server for granting and/or denying software access requests from one or more software applications running external to the building controller unit based on the software license information stored in the building controller unit.

12 Claims, 3 Drawing Sheets

(56) References Cited

U.S. PATENT DOCUMENTS

| | | |
|---|---|---|
| 2002/0138441 A1 | 9/2002 | Lopatic |
| 2002/0194010 A1 | 12/2002 | Bergler et al. |
| 2003/0149670 A1 | 8/2003 | Cronce |
| 2003/0185399 A1 | 10/2003 | Ishiguro |
| 2003/0233432 A1* | 12/2003 | Davis et al. .................. 709/222 |
| 2004/0010471 A1 | 1/2004 | Lenard et al. |
| 2004/0034603 A1* | 2/2004 | Hastings et al. ................ 705/63 |
| 2004/0054920 A1 | 3/2004 | Wilson et al. |
| 2004/0117467 A1 | 6/2004 | Rich et al. |
| 2004/0249815 A1 | 12/2004 | Lee |
| 2005/0033967 A1 | 2/2005 | Morino et al. |
| 2005/0044046 A1 | 2/2005 | Ishiguro |
| 2005/0102240 A1 | 5/2005 | Misra et al. |
| 2005/0138082 A1 | 6/2005 | Rauma et al. |
| 2005/0144140 A1 | 6/2005 | Nagao |
| 2005/0146966 A1 | 7/2005 | Kawamura |
| 2005/0273436 A1 | 12/2005 | Coley et al. |
| 2006/0031170 A1 | 2/2006 | Septon |
| 2006/0031172 A1 | 2/2006 | Otsuka |
| 2006/0106730 A1 | 5/2006 | Coley et al. |
| 2006/0106731 A1 | 5/2006 | Coley et al. |
| 2006/0114121 A1* | 6/2006 | Cumeralto et al. ...... 340/870.02 |
| 2006/0122940 A1 | 6/2006 | Coley et al. |
| 2006/0136343 A1 | 6/2006 | Coley et al. |
| 2006/0167815 A1 | 7/2006 | Peinado et al. |
| 2006/0209844 A1* | 9/2006 | Carpenter et al. ........ 370/395.52 |
| 2006/0235802 A1 | 10/2006 | Cappio et al. |
| 2006/0294019 A1 | 12/2006 | Dayan et al. |
| 2007/0011097 A1 | 1/2007 | Eckleder |
| 2007/0022469 A1 | 1/2007 | Cooper et al. |
| 2007/0033395 A1 | 2/2007 | MacLean |
| 2007/0213856 A1* | 9/2007 | Kosaka ........................... 700/83 |
| 2008/0150750 A1* | 6/2008 | Parris et al. .............. 340/870.02 |
| 2008/0224890 A1* | 9/2008 | Salser et al. ............. 340/870.02 |
| 2009/0066537 A1* | 3/2009 | Salser et al. ............. 340/870.02 |
| 2009/0102681 A1* | 4/2009 | Brennan et al. .......... 340/870.03 |
| 2009/0153356 A1* | 6/2009 | Holt ........................ 340/870.02 |
| 2009/0287837 A1* | 11/2009 | Felsher ........................ 709/229 |

OTHER PUBLICATIONS

Wasley "An Information Architecture for UC: Critical Building Blocks," 11 pages, May 1996.

* cited by examiner

EMBEDDED BUILDING CONROLLER WITH STORED SOFTWARE LICENSE INFORMATION

FIELD

The present invention relates generally to building controller systems, and more particularly, to managing licenses in building control systems.

BACKGROUND

Many modern building control systems, or building automation systems, include a programmed, computerized, "intelligent" network of building controllers that monitor and control the mechanical, lighting and/or other systems of a building. The use of building control systems can, for example, reduce energy use, reduce maintenance costs, and/or increase the comfort of a building. In many cases, the building controllers used in such building control systems are application specific controllers, or embedded building controllers, that are adapted to control a particular function and/or region of a building. Such embedded building controllers come in a wide range of sizes and capabilities that are application specific for controlling a particular type of device or system within a building.

Many building control systems have a personal computer or other general purpose computer or workstation connected to the building control system network. Building control software is typically run on the personal computer or workstation, and is used to help control and/or monitor the operation of the overall building control system. The building control software can, for example, help setup, configure, program and/or monitor the various embedded building controllers on the network, as well as monitor and control the operation of the overall building control system. The building control software typically communicates with the various embedded building controllers that are connected to the building control network.

In many cases, the building control software is licensed to the end user, and the license can contains certain restrictions. For example, the license may restrict the number of devices on the network, the number of devices that can be managed on the network, the number of points in the system, the functionality or features of the building control software available to an end user, and/or the number of users on the network or that can simultaneously access the building control software. In addition, licenses for building control software can be tied to a particular personal computer that is connected to the building control system network and the license may not be easily transferred to another personal computer. These are just a few example licensing restrictions that are commonly associated with building control software.

Typically, to enforce the license restrictions, a license file is provided that includes the authorization for the building control software. In some cases, the license file is provided on a hardware dongle, sometimes known as a hardware key or token. A hardware dongle is a small hardware device that is typically directly connected to the general purpose computer running the building control software, such as the above-referenced personal computer or workstation. The hardware dongle typically authenticates the use of the building control software on the computer or workstation. In some cases, the hardware dongle is connected to the computer or workstation via a PCMCIA interface, a USB interface, a parallel port interface, or a printer port interface. When the hardware dongle is not connected to the computer or workstation, the building control software typically runs in a restricted mode or not at all, depending on license terms. The use of hardware dongles can have certain disadvantages including, for example, a relatively high cost of implementation, a relatively high amount of technical support, physical access to the personal computer, and/or manually moving the hardware dongle from one personal computer to another to transfer the license.

Rather than using a hardware dongle, and in some cases, a license file is installed on the hard drive of the general purpose computer or workstation that runs the building control software, such as the above-referenced personal computer or workstation. In such cases, the license file may be "keyed" to a unique hardware identification of the personal computer. During use, the building control software may read the license file to authenticate the use of the building control software and/or functions provided therein. As with hardware dongles, this approach has certain disadvantages. For example, installing the license file on the hard drive of the computer or workstation that runs the building control software may require a new license file to be issued from the manufacturer whenever the user wishes to run the building control software on a different computer or workstation, or when the original computer or workstation fails or needs to be upgraded. However, in some cases, when a license is reissued, there may be no way to verify that the old license is no longer being used. Also, technical support may be required when installing and maintaining the license file.

SUMMARY

The following summary is provided to facilitate an understanding of some of the innovative features unique to the present invention and is not intended to be a full description. A full appreciation of the invention can be gained by taking the entire specification, claims, drawings, and abstract as a whole.

The present invention relates generally to building controller systems, and more particularly, to managing software licenses in a building control system. In one illustrative embodiment, a building control system may include a number of application specific, building controllers, or embedded building controllers, that are connected in a network configuration. The embedded building controllers may be adapted to, for example, control a particular piece or group of building equipment, control a function, and/or control a region of a building.

In addition to providing some level of control over equipment in the building, one or more of the building controllers may store a license file, which can contain authorization information for software running on one or more of the building controllers on the network, and/or for a building control software package that can be run on a general purpose computer or workstation that is connected to the network. The license file may, for example, specify which functions or services may be performed by the building controllers and/or building control software, the number and/or types of building controllers that may be connected to the network, the number of users that may simultaneously access the building control software, and/or any other suitable restrictions. In some cases, one or more of the building controllers may provide a license server, which sometimes can include the license file, and which can, for example, verify the authenticity of the license file to a building control software package and/or software running on building controllers that are connected to the building control system network.

BRIEF DESCRIPTION

The invention may be more completely understood in consideration of the following detailed description of various illustrative embodiments of the invention in connection with the accompanying drawings, in which.

DETAILED DESCRIPTION

Figure 1:
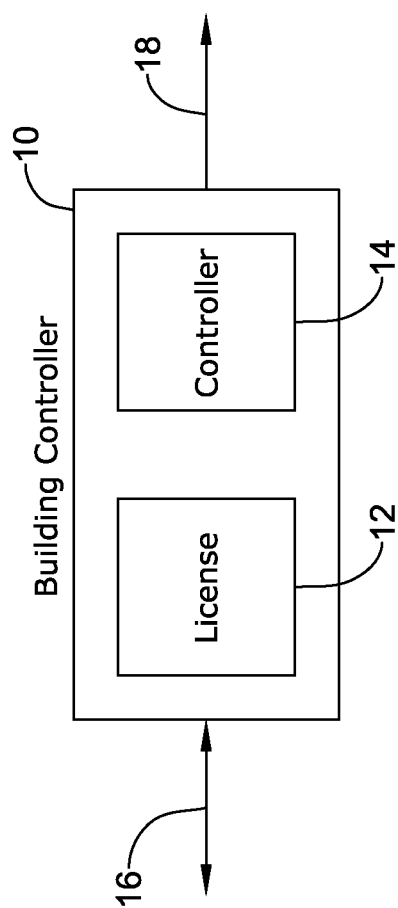
FIG. 1 is a block diagram of an illustrative building controller that includes a license.

The following description should be read with reference to the drawings wherein like reference numerals indicate like elements throughout the several views. The detailed description and drawings show several embodiments, which are meant to be illustrative of the claimed invention.

The present invention relates generally to building controller systems, and more particularly, to managing software licenses in building control systems. In one illustrative embodiment, a building control system includes a number of application specific building controllers, or embedded building controllers, that are connected in a network configuration. The embedded building controllers may be adapted to, for example, control a particular piece or group of equipment, control a function, and/or control a region of a building.

In addition to providing some level of control over equipment in the building, one or more of the building controllers may store a license file, which can contain authorization information for one or more of the building controllers on the network and/or for a building control software package that is run on a general purpose computer or workstation that is connected to the network.

FIG. 1 is a block diagram of an illustrative embedded building controller 10 that includes a license 12, also referred to as a license file, and a controller 14. The illustrative building controller 10 may be adapted to be connected to a building control system network (see FIG. 2) via a network interface 16, and one or more pieces of HVAC, lighting, security, fire or other equipment via interface 18. The controller 14 may be adapted to, for example, control a particular piece or group of equipment, control a function, and/or control a region of a building.

In the illustrative embodiment, the license 12 may, for example, specify which functions or services may be performed by the building controllers and/or building control software that is connected to the building control system network, the number and/or types of building controllers that may be connected to the network, the number of users that may simultaneously access the building control software on the network, and/or any other suitable restrictions as desired. The license 12 may be a block a data that can be authenticated (ie: it may signed and the signature or integrity of the file can be verified). In some cases, the data may contain the information about what functions may be allowed and/or restricted by the license 12.

As previously indicated, and in some embodiments, the building controller 10 may itself be considered an embedded controller. An embedded controller is a controller designed for specific and/or pre-defined applications, as opposed to a general purpose computer that is designed to handle more general tasks. In some cases, the building controller 10 shown in FIG. 1 may be completely encapsulated by, or dedicated to, the device(s) or system(s) that it controls. In an illustrative embodiment, the building controller 10 may be, but is not limited to, a heating, ventilation, and air condition (HVAC) controller, a security system controller, a lighting system controller, a fire system controller, a power management controller, or any other suitable type of building controller, as desired.

In some cases, the building controller 10 may be an HVAC controller, and may control HVAC functions, such as, for example, HVAC schedules, temperature setpoints, humidity setpoints, trend logs, timers, environment sensing, and/or other HVAC functions, as desired. In other cases, the building controller 10 may be a security controller, and the controller 14 may control security functions, such as, for example, motion detection, contacting police, operating alarms, monitoring and controlling cameras, operating security lights, and/or other security functions, as desired. In another example, the building controller 10 may be a lighting controller, and the controller 14 may control lighting functions, such as, for example, room lighting, lighting schedules, light timers, occupancy detectors, and/or other lighting functions, as desired. In still another example, the building controller 10 may be a fire controller, and the controller 14 may control fire functions, such as, for example, smoke detection, heat sensing, air quality sensing, notifying fire departments, sprinkler operation, activating alarms, and/or other fire functions, as desired.

In the illustrative embodiment, the license file 12 may include one or more license files or even a license database. In some cases, the license file 12 may, for example, specify which functions or services may be performed by the building controllers and/or building control software that are connected on the building control system network, the number and/or type of building controllers that may be connected to the network, the number of users that may simultaneously access the building control software on the network, and/or any other suitable restriction as desired.

In some cases, the license file 12 may be a comprehensive license file including all the licenses for the building control system. In other cases, the license file 12 may be a limited license that includes only a portion of all the licenses for the building control system. When the license file 12 is limited, and in some cases, it may only include the license information for a portion of the building control system. For example, if the building controller 10 is a HVAC controller, the license file 12 may only include HVAC license information, if the building controller 10 is a security controller, the license file 12 may only include security license information, if the building controller 10 is a lighting controller, the license file 12 may only include lighting license information, and if the building controller 10 is a fire controller, the license file 12 may only include fire license information.

In some cases, the license file 12 may use a public key infrastructure (PKI) system. With this system, the license file 12 may be signed by the manufacturer with the manufacturer's private key. The license file 12 may also include a unique identifier associated with a building control system device, but this is not required in all embodiments. In order to run the building control system software, the license file 12 may have to be authenticated, or have its integrity verified. In such cases, the license file 12 may be authenticated with the manufacturer's public key. The authentication of the license file 12 may be performed by the building controller 10 itself, with the building controller 10 acting as a license server on the building control system network, but this is not required. In other cases, the license file 12 authentication may be performed by a computer connected to the network, such as the general purpose computer running a building control software package.

In some embodiments, the license file 12 may also include other information. For example, the license file 12 may include a database of the authorizations granted for the various software applications that are connected to the network. Also, in some cases, the license file 12 may include leases for access to certain function or services of certain software application that are not provided for in the originally granted license.

The building controller 10 may be provided as part of a larger building system control system. As noted above, and in some cases, the building controller 10 may be in communication with other components on the building control system network via network interface 16. For example, the building controller 10 may be in communication with one or more general purpose computers or workstations, other building controllers, and/or other systems or component, as desired. Additionally, and as indicated above, the building controller 10 may be in communication with and control one or more building components via one or more I/O interfaces 18. The building components may monitor and/or control one or more physical properties of the building, such as temperature, humidity, ventilation, building access, lighting, fire detection and/or fire suppression, etc.

The license file 12 may, in some cases, act as a floating license, allowing multiple users, up to the license limit, to use a building control software package that is executing on a general purpose computer that is connected to the network. For example, an end user may have purchased a license to have simultaneous access to the building control network for four personal computers. If a fifth personal computer is activated, the license file 12 may deny access to one of the personal computers, thereby preventing the denied personal computer from accessing the building control network.

In a similar way, the license file 12 may allow multiple building controllers 10, up to a limit, to be connected to the building control system network. For example, an end user may have purchased a license to have four HVAC building controllers 10 connected to a network, with each building controller 10 controlling an HVAC rooftop unit that services a corresponding zone of a building. Each of the HVAC building controllers 10 may include a software application or utility that checks out one license from the license upon startup. If the user installs five HVAC building controllers 10, the license file 12 may deny access to one of the HVAC building controllers 10, thereby preventing the denied HVAC building controller 10 from operating properly or with full functionality.

Figure 2:
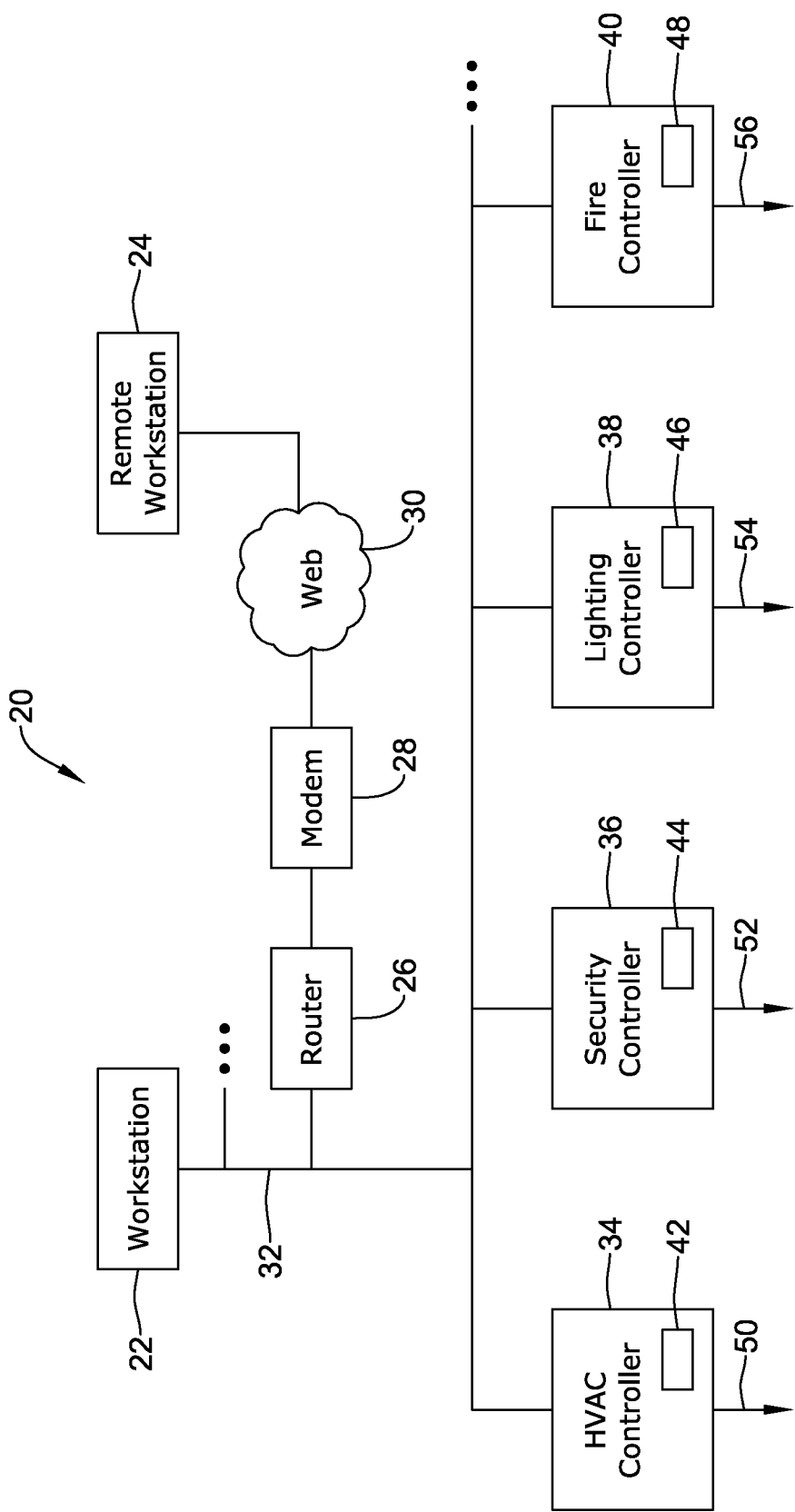
FIG. 2 is a schematic diagram of an illustrative building control system network including a license file stored in at least one embedded building controller.

FIG. 2 is a schematic diagram of an illustrative building control system network 20 that includes a license file embedded in each of a number of building controllers. In the illustrative embodiment, the building control system includes a network 20 that has one or more building controllers 34, 36, 38 and 40. At least one of the building controllers 34, 36, 38 and 40 includes a license file, such as license file 42, 44, 46, and 48. The illustrative building control system network 20 may also have one or more general purpose computers or workstations 22 and 24 connected thereto.

In the illustrative embodiment, the one or more workstation 22 and 24 may be general purpose computers or workstations, PDAs, or any other device, as desired. In some cases, a remote workstation 24 may be connected to the network 20 via a modem 26 and router 28. However, in some cases, router 28 may be connected to the web 30, or any other suitable method of connecting a remote workstation 24 to the network 20 may be used, as desired. In some cases, this may allow the remote workstation 24 to access the license files 42, 44, 46, and/or 48, and operate licensed building control software, if desired. Depending on the application, the building control network 20 can have a flat network architecture or a hierarchy of connected networks.

One or more of the workstations 22 and 24 may include a building control software package that can be used to help control and/or monitor the operation of the overall building control system. The building control software can, for example, help setup, configure, program and/or monitor the various embedded building controllers 36, 36, 38 and 40 on the network 20, as well as monitor and control the operation of the overall building control system. The building control software typically communicates with the various embedded building controllers 36, 36, 38 and 40 that are connected to the building control network 20.

In some cases, the building control software is licensed to the end user, and the license can contains certain restrictions. For example, the license may restrict the use of the building control software to a particular personal computer or workstation that is connected to the building control system network 20, such as workstation 22. Alternatively, or in addition, the license may restrict the number of users that can simultaneously access the building control software, and/or can restrict which features or functions of the building control software are available to the end user. These are just a few example licensing restrictions that are commonly associated with building control software. In the illustrative embodiment, the workstations 22 and 24 may be in communication with one or more of the license files 42, 44, 46, and 48 via network connection 32, so that the building control software can access the license file and the authorization information provided therein. The license file may be authenticated by a license server on the building controllers 36, 36, 38 and 40, or on the workstations 22 and 24 themselves.

In the illustrative embodiment, the one or more building controllers 34, 36, 38, and 40 may be embedded building controllers that are adapted to control one or more building components (not shown) via one or more I/O interfaces 50, 52, 54 and 56. The building components may monitor and/or control one or more physical properties of the building, such as temperature, humidity, ventilation, building access, lighting, fire detection and/or fire suppression, etc.

In an illustrative embodiment shown in FIG. 2, building controller 34 is shown as an HVAC controller, and may control HVAC functions, such as, for example, HVAC schedules, temperature setpoints, humidity setpoints, trend logs, timers, environment sensing, and/or other HVAC functions, as desired. Example HVAC building components that may be controlled by the HVAC controller may include, but are not limited to, dampers, valves, sensors, AC units, heating units (i.e. boilers, furnaces, etc.), and ventilators.

Building controller 36 is shown as a security controller, and may control security functions, such as, for example, motion detection, contacting police, operating alarms, monitoring and controlling cameras, operating security lights, and/or other security functions, as desired. Example security building components may include, but are not limited to, detectors (i.e. motion, fire, smoke, glass, etc.), alarms, cameras, and security lights.

Building controller 38 is shown as a lighting controller, and may control lighting functions, such as, for example, room lighting, lighting schedules, light timers, occupancy detectors, and/or other lighting functions, as desired. Example lighting building components may include, but are not limited to, timers, occupancy sensors, and light fixtures.

Building controller 40 is shown as a fire controller, and may control fire functions, such as, for example, smoke detection, heat sensing, air quality sensing, notifying fire departments, sprinkler operation, activating alarms, and/or other fire functions, as desired. Example fire building components may include, but are not limited to, detectors (i.e. smoke, heat, air quality, etc.), alarms, and sprinklers.

In some embodiments, as illustrated, there may be multiple license files or license servers, 42, 44, 46, and 48. In some embodiments, each of the license files 42, 44, 46, and 48 may include the license information that is related to the function of the corresponding building controller 34, 36, 38, and 40. For example, license file 42 may include HVAC related license information, license file 44 may include security related license information, license file 46 may include lighting related license information, and the license file 48 may include fire related license information. In other embodiments, there may be only one license file for all functions, or some other number of license files, as desired. For example, the license file 42 may include all of the license information for all building controllers 34, 36, 38 and 40 and/or license information for any building control software package that may be provided.

In the illustrative embodiment, the building controllers 34, 36, 38, and 40 may be connected or in communication via a network interface 32. The workstation 22 and/or the remote workstation 24 may also be in communication with the building controllers 34, 36, 38, and 40 via the network interface 32. In some cases, the network interface 32 may be an Ethernet or other network interface, and/or may include the building's power lines as the interface. More generally, it is contemplated that the network interface 32 may be any suitable interface that allows the building controllers 34, 36, 38 and 40, and/or the workstations 22 and 24 to communicate.

Figure 3:
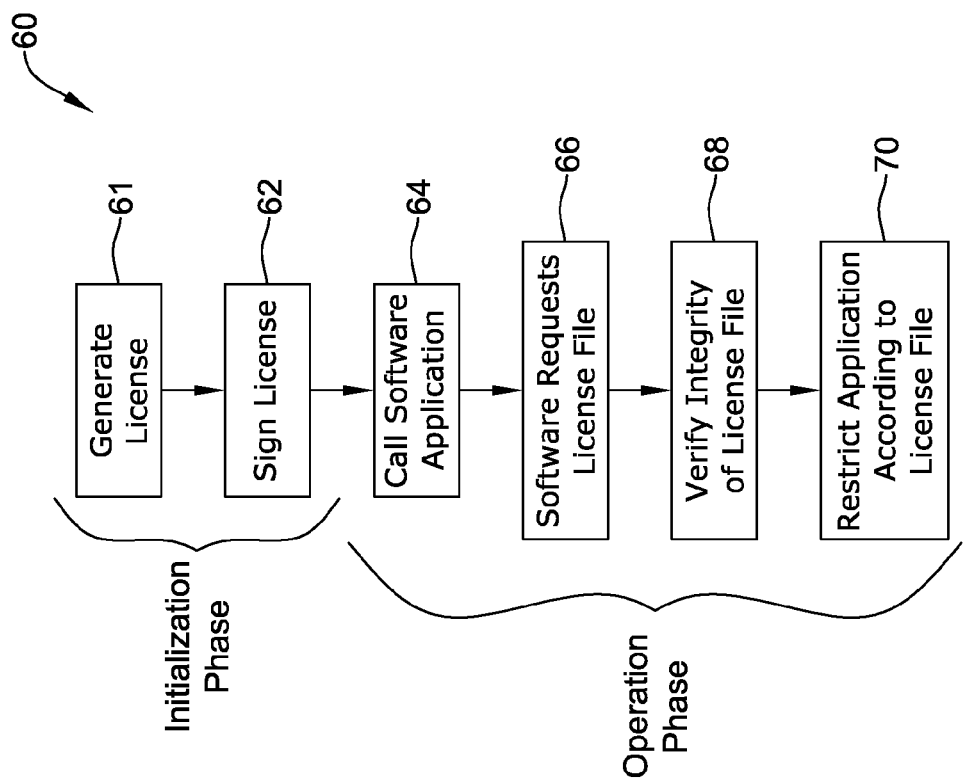
FIG. 3 is a flow diagram of an illustrative method of operating a building control system in conjunction with a license file that is stored in at least one embedded building controller.

FIG. 3 is a flow diagram of an illustrative method of operating a building control system in conjunction with a license file that is stored in at least one embedded building controller. For illustrative purposes, the illustrative license file will be described with reference to a public key infrastructure (PKI) system. However, it is contemplated that any suitably licensing authentication system may be used, as desired.

Initially, in the initialization phase, in block 61, a license may be generated. In some cases, the license may be generated by a manufacturer. The license may be created with a unique identifier associated with the control system and configured with authorization information describing the particular features and functionality generated by the license. In some cases, as indicated above, the license file may be tied to or include a unique identifier associated with a particular building controller. The unique identifier may include, for example, a serial number, an Ethernet Message Authentication Code (MAC) address, or any other unique identifier as desired. In some cases, the unique identifier may help the other building controllers and/or building control software package identify the building controller that has the license file.

Then, in block 62, a signature or other verification information may be added to the license. In the illustrative example, the license may be signed with a private key of the manufacturer. Signing may include adding a digital signature to the license file that may allow a third party to verify that the file was not modified. In some cases, the license file may be signed before or during the installation of the building controller.

Next, in the operation phase, a software application or utility may be launched. In some cases, the software application or utility may be a building control software package launched by a user at a workstation, either a local workstation or a remote workstation. In other cases, the software application or utility may be launched in a building controller. In many cases, the normal operation of the building controller may begin at block 64.

Next, at block 66, the software application or utility can request license information, such as, for example, license authorization information for granting or denying functionality of an application, from the license file. In some cases, the license file may include a license server function providing at least some of the license information upon the request from an application. The software application or utility may request license information when the software application or utility is being launched. In other cases, the software application or utility may request license information after it has launched.

To request the license file, the software application or utility may communicate directly with the embedded building controller that includes the license file via a network. If a building control software package is launched on a general purpose computer or workstation, the general purpose computer or workstation may communicate with one or more embedded building controllers that include the desired license information.

Then, at block 68, the integrity of the license file is verified. In some cases, the license file may be verified that the license was in fact generated by the manufacturer's private key by a license server using the manufacturer's public key to verify the integrity of the license file. In some cases, the license verification may be performed by the general purpose computer or workstation, or, in other cases, the license verification may be performed by one or more of the embedded building controller. However, in other cases, the verification license verification may be performed by the application or the component running the application, as desired. Verifying the integrity of the license file may help ensure that the license file is authentic and has not been tampered with by an end user. If the integrity of the license file has been compromised, the software application or utility may be restricted from operating, and the license file may be held invalid.

If the integrity of the license file is verified, then, at block 70, the software application or utility may use the authorization information in the license file to grant or deny access to certain software applications and/or functions. For example, and in some cases, the license file may grant or restrict the software application or utility according to the authorization information contained in the license file. The license file may, for example, restrict the number of building controllers that can be functioning concurrently on a network, the number of users that may concurrently use a building control software package, the tasks or functions that can be performed by the building control software package and/or the one or more embedded building controllers that are connected to the network, etc. In some cases, the granting and/or denying of application functionality may take place in one of the one or more embedded building controller and transmitted to the application. In other cases, the granting and/or denying of the application functionality may take place in the general purpose computer or workstation, in the application, or in any other suitable place, as desired.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

The invention claimed is:

1. An embedded building controller unit, comprising:
an embedded building controller configured to control one or more building components of a building;
an interface for receiving license access requests from one or more software applications that are running external to the embedded building controller unit; and
a license server within the embedded building controller unit coupled to the interface, the license server granting or denying the access requests based on license information stored within the embedded building controller unit.

2. The embedded building controller unit of claim 1, wherein the embedded building controller is an HVAC building controller.

3. The embedded building controller unit of claim 1, wherein the embedded building controller is a security controller.

4. The embedded building controller unit of claim 1, wherein the embedded building controller is a fire controller.

5. The embedded building controller unit of claim 1, wherein the embedded building controller is a lighting controller.

6. An embedded building controller unit, comprising:
an embedded building controller configured to control one or more building components of a building;
an interface for receiving license access requests from one or more software applications that are running external to the embedded building controller unit;
a license server within the embedded building controller unit coupled to the interface; and
an application requesting license information from the license server, the application granting or denying access requests based on the license information stored within the embedded building controller unit.

7. The embedded building controller unit of claim 6, further comprising one or more I/O interfaces for interfacing with the one or more building components, wherein the one or more building components are configured to monitor and/or control one or more physical properties of the building, wherein the one or more physical properties of the building include one or more of temperature, humidity, ventilation, building access, lighting, fire detection and fire suppression.

8. The embedded building controller unit of claim 1, wherein the license server is configured to provide at least some of the license information upon request from one or more software applications that are running external to the embedded building controller unit.

9. The embedded building controller unit of claim 1, wherein the license server is configured to provide at least some of the license information to one or more external building controllers that are coupled to the interface upon request to enable one or more functions of the one or more external building controllers.

10. A building controller unit for use in a building control system, comprising:
a building controller configured to control one or more building components of a building;
an interface for connecting the building controller unit to one or more remotely located building controller components of a building control system; and
a memory for storing license information, wherein the building controller unit is configured to receive requests from one or more remotely located building controller components of the building control system via the interface, and in response, provide at least some of the license information in order to enable and/or disable one or more functions of the one or more remotely located building controller components of the building control system.

11. The building controller unit of claim 10, further comprising a license server coupled to the memory, wherein the license server, in response to received requests from one or more remotely located building controller components, provides at least some of the license information in order to enable and/or disable one or more functions of the one or more remotely located building controller components of the building control system.

12. The building controller unit of claim 10, further comprising a license server coupled to the memory, wherein the license server, in response to received requests from one or more remotely located building controller components, granting or denying access requests based on the license information stored within the memory.

* * * * *